United States Patent [19]
Monson et al.

[11] Patent Number: 5,453,924
[45] Date of Patent: Sep. 26, 1995

[54] MOBILE CONTROL SYSTEM RESPONSIVE TO LAND AREA MAPS

[75] Inventors: Robert J. Monson, St. Paul; Eric M. Dahlen, West St. Paul, both of Minn.

[73] Assignee: Ag-Chem Equipment Company, Inc., Minnetonka, Minn.

[21] Appl. No.: 243,506

[22] Filed: May 16, 1994

[51] Int. Cl.⁶ .................................................. G05B 15/00
[52] U.S. Cl. .................... 364/131; 364/138; 364/424.07; 239/61
[58] Field of Search ...................... 364/131–139, 364/184–187, 424.01, 424.02, 424.05, 424.07, 432, 434; 395/905, 913, 904; 239/1, 61, 63

[56] References Cited

U.S. PATENT DOCUMENTS

| | | | |
|---|---|---|---|
| 3,499,731 | 3/1970 | Sackett, Sr. ........................... | 23/259.1 |
| 3,637,347 | 1/1972 | Jonakin et al. ........................ | 23/122 |
| 3,952,741 | 4/1976 | Baker .................................... | 128/260 |
| 4,089,899 | 5/1978 | Greidinger et al. ................... | 260/553 |
| 4,173,582 | 11/1979 | Greidinger et al. ................... | 260/553 |
| 4,212,428 | 7/1980 | Walker ................................... | 239/677 |
| 4,456,176 | 6/1984 | Agius .................................... | 239/142 |
| 4,500,951 | 2/1985 | Susimoto et al. ..................... | 364/138 |
| 4,527,353 | 7/1985 | Newby ................................... | 47/59 |
| 4,630,773 | 12/1986 | Ortlip ..................................... | 239/1 |
| 4,641,269 | 2/1987 | Japenga et al. ....................... | 364/138 |
| 4,831,582 | 5/1989 | Miller et al. .......................... | 364/138 |
| 4,839,177 | 6/1989 | Colombo et al. ..................... | 424/482 |
| 4,855,906 | 8/1989 | Burke .................................... | 364/138 |
| 4,878,614 | 11/1989 | Hach et al. ............................ | 239/10 |
| 4,972,367 | 11/1990 | Burke .................................... | 364/138 |
| 5,021,939 | 6/1991 | Pulgiese ................................ | 364/143 |
| 5,058,636 | 10/1991 | Simmel et al. ........................ | 141/346 |
| 5,146,401 | 9/1992 | Bansal et al. ......................... | 364/138 |
| 5,162,986 | 11/1992 | Graber et al. ......................... | 364/136 |
| 5,170,820 | 12/1992 | Jones .................................... | 137/899 |
| 5,172,740 | 12/1992 | Simmel et al. ........................ | 141/321 |
| 5,184,420 | 2/1993 | Papadopoulos et al. .............. | 47/62 |
| 5,220,876 | 6/1993 | Monson et al. ....................... | 111/130 |
| 5,270,917 | 12/1993 | Kimura ................................. | 364/187 |

*Primary Examiner*—James P. Trammell
*Attorney, Agent, or Firm*—Larkin, Hoffman, Daly & Lindgren, Ltd.

[57] ABSTRACT

A distributed network product applicator control system uses object-oriented software, windows interfacing, distributed network technology and Echelon LonWorks network technology allowing a fixed loop system to be expanded by adding a multiplicity of additional loops to the system with only a transparent effect on the whole. Each loop is independent thereby allowing application of a product in response to an application map for an area which is unique only to that particular loop.

12 Claims, 3 Drawing Sheets

CAB COMPONENTS         EXTERNAL COMPONENTS

MOBILE CONTROL SYSTEM RESPONSIVE TO LAND AREA MAPS

BACKGROUND OF THE INVENTION

1. Field of the Invention

This invention relates to product application control systems. More particularly, this invention relates to a product application control system for use with a distributed network.

2. Description of the Prior Art

Present agricultural product applicator control systems are designed for simple closed looped control of a multiple loop system. At present, the maximum amount of loops that can be added to a network typically would approach 10. Beyond this value, the overall packet structure and network control would become cumbersome, requiring significant redesign of the overall system.

A typical modern system is laid out with a host controller located within the cab of a vehicle, made up of a processor with associated input and output devices. This host is typically directly linked to a controller located within the cab, which is responsible for all communication to devices on the chassis of the vehicle. Such a system is shown in Ortlip U.S. Pat. No. 4,630,773 issued Dec. 23, 1986 entitled "Method and Apparatus for Spreading Fertilizer". Another system is shown in Monson et al., U.S. Pat. No. 5,220,876 issued Jun. 23, 1993 entitled "Variable Rate Application System" and assigned to the Assignee of the present invention.

In known systems such as those stated above, the addition of loops to the control requirements adds great complexity to the system wiring. This results in a realistic limit to the amount of loops that can be added to a single system. Beyond this limit, the amount of wiring and routing for the wiring becomes a matter of greater importance. At present, it is felt that a value of 10 loops is the approximate limit for a single host system as stated hereinbefore.

Software construction also places many constraints on the design and application of a control system, as the common top down design has certain flow characteristics that define a specific flow path within the operating system. This also limits the effective amount of devices that can be controlled with a single system, as eventually the communication link to the devices becomes the limiting factor.

The aforementioned software construction implies that any changes in requirements, such as the inclusion of an additional loop on the vehicle, often causes sweeping changes within the code. This also has obvious trickle-down effects that are not desired within the flow structure of the program.

Thus, debugging and testing become required parts of the system maintenance, requiring large amounts of capital and time to assure a simple change has not caused greater errors elsewhere in the system (often occurring in totally unrelated places).

For the aforementioned reasons, it becomes apparent that existing product application control system designs are by no means desirable, and an entirely new approach is required. As will be demonstrated below, the present invention provides a solution to this dilemma.

SUMMARY OF THE INVENTION

The present inventive product applicator control system provides a method and apparatus intended to overcome many of the shortcomings and attendant disadvantages of past control systems utilized by the agronomics industry. Several problems are considered unavoidable within the industry, some of which have been discussed hereinbefore. The present invention, however, surmounts many of these problems with a radical new approach to controls design.

Object-oriented design was developed within the software industry to create a system capable of expansion or retraction with very little effect on the system as a whole. This implies that in the case of the present invention, a two loop system could be expanded into a 10 loop system, for example, with only a transparent effect on the whole. This has been accomplished through the use of several state-of-the-art technologies including the aforementioned object-oriented software design, as well as windows interfacing, distributed network controls and Echelon LonWorks network technology.

Object-oriented Software design is critical in an ever-changing system such as that displayed by the present invention. With the use of objects, the software is translated from a top-down flow chart into a dynamic system that reacts to the world around it, in much the same manner one would expect the control system to operate. This is accomplished with a message-based system such as the windows interface, which increases userability, but also allows a new approach to task completion.

The objects are designed in a fashion that allows ease of expansion and upgradability, easing maintenance in the future. Because of the packaging of objects, the trickle-down effect is removed from the system when upgrades are incorporated. Thus, the flow of the system is not so completely interrelated, and a change in one area will not cause unexpected problems elsewhere, as was the case in past systems.

The aforementioned inventive control system also implies that testing is greatly simplified, as only the area of interest is tested. Because the actual flow path of other areas is not disturbed in any way, it is not necessary to perform redundant and excessively costly testing of the complete system. Thus, system testing becomes an option and not a necessity.

Distributed network controls were selected for the present inventive system for much the same reason as object-oriented software. Use of a distributed network is intended to create the simplest method of network expansion or retraction without excessively burdening the system with overhead costs. In other words, with a standard system, it is easy to include 10 control loops on every machine in order to create a common fleet of vehicles. Unfortunately, this means unnecessary costs are incurred on vehicles requiring only one loop. Thus, a distributed network has been developed which allows only required hardware as necessary components.

The aforementioned control system design allows ease of expansion as discussed hereinbefore, but also brings a great enhancement in the area of manufacture. The design further incorporates a single twisted pair of wires which is run into the cab. All other wiring is external to the cab, itself a great improvement over existing systems. But, the majority of the wiring has been moved beyond the cab to the location of the actuation and sensing. This means the complex, machine dependent wiring occurs only at the actuator and in a modular fashion.

Proper development of a distributed network, also allows the node hardware to be identical from node to node, which implies that each machine control system is identical, with the only differences being in the number of nodes and the machine dependent wiring such as that displayed by the present invention.

Placing the node control at the location of the actuator reduces attenuation of the signal, the incorporation of noise and the packaging of loop-dependent controllers. Thus, the intelligence of the controller is distributed throughout the vehicle. This also allows a great enhancement of the associated diagnostic system. With the control loops separated, and with each node capable of self-sustained control, each loop can also be responsible for diagnostics, failure testing and minimal data-logging, thereby freeing the main processor from such tasks as communication and allowing the real generation of expert systems for multiple map input command processing.

The present inventive system additionally incorporates Echelon LonWorks technology to support the aforementioned benefits, as this is an intelligent network, with many of the required features built-in. This means diagnostics are more easily incorporated, communications are minimized and the majority of calculation related to command constants are calculated at the node level rather than at the host level and communicated across the network. Thus, an intelligent network further enhances the overall vision for the present invention.

From the foregoing, it is clear that the present inventive control system performance is greatly enhanced over existing systems. Other features of the present inventive product application control system include ease of use, manufacture, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

DETAILED DESCRIPTION OF THE PREFERRED EMBODIMENT(S)

Figure 1:
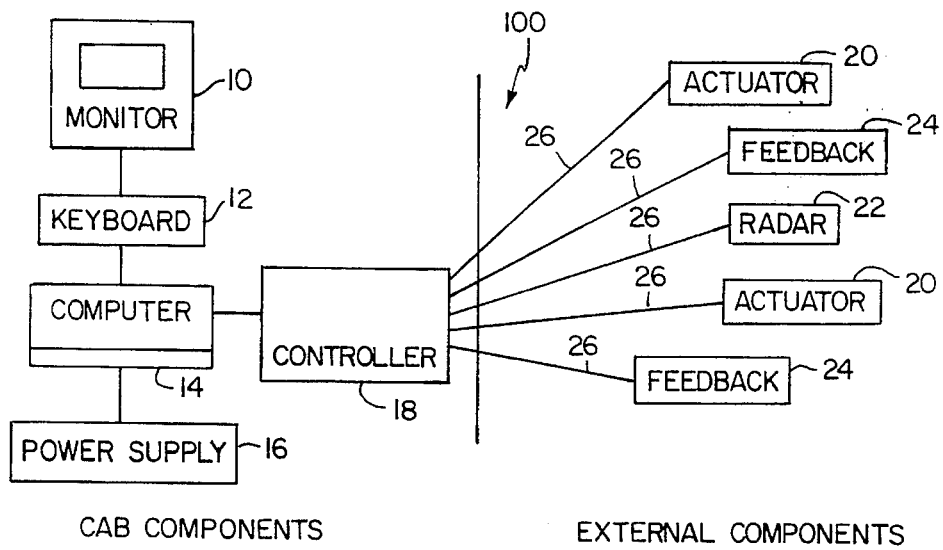
FIG. 1 illustrates a simplified typical existing control system used in the agricultural industry for the application of agricultural products.

Referring to FIG. 1, a presently known product application control system 100 includes a host controller 18 located within the cab of a vehicle (not shown), made up of a processor/computer 14 with associated input and output devices including monitor 10 and keyboard 12. The host controller 18 is responsible for all communication to devices such as actuator 20 including actuator feedback 24 to controller 18 and, for example, a radar device 22 on the chassis of the vehicle. As shown, the addition of loops 26 to the control requirements adds great complexity to the overall control system 100 wiring.

Figure 2:
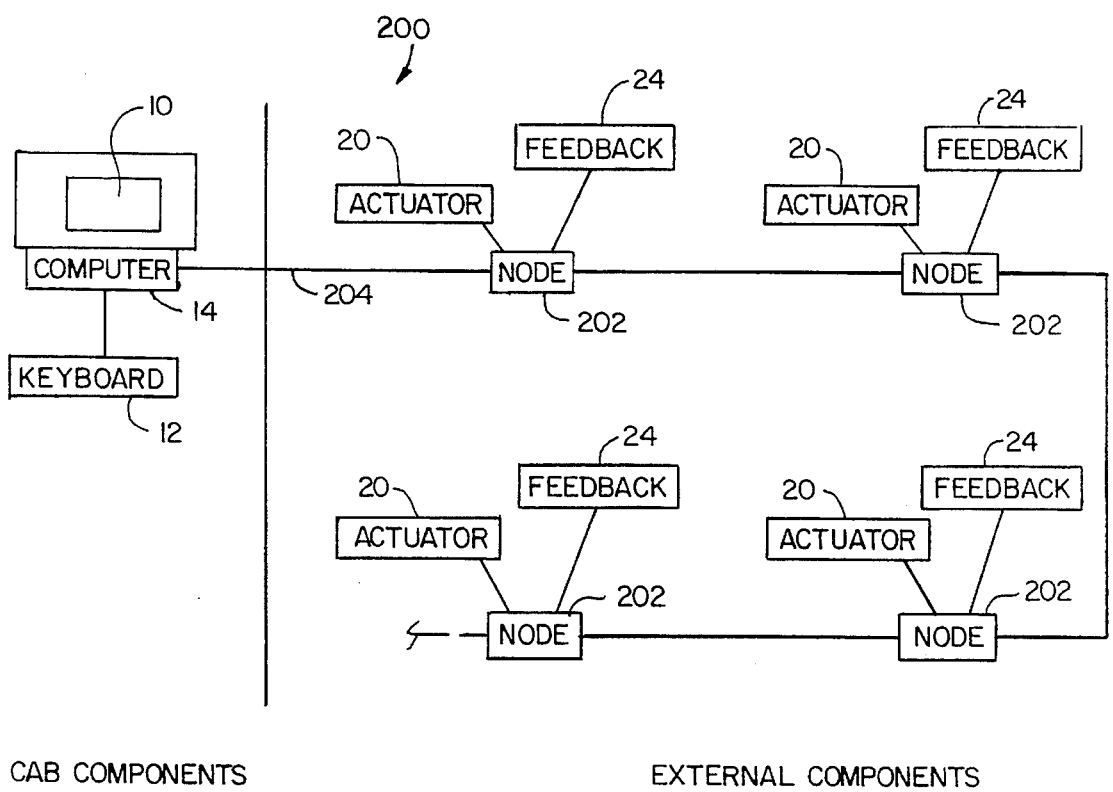
FIG. 2 is a simplified block diagram of a product application control system in accordance with the present invention.

Moving on now to FIG. 2, one embodiment 200 for the present inventive product application control system includes a processor/computer 14 with associated input and output devices 10, 12 located within the cab of the vehicle (not shown). Computer 14 is connected to a distributed network via a single twisted pair of wires 204 which is run into the cab (not shown). All other system wiring is external to the cab.

The distributed network control system 200 includes multiple nodes 202, theoretically unlimited in number. It can thus be seen that the majority of the wiring displayed in control system 100 has been moved beyond the cab to the location of the actuation 20 and sensing, including feedback 24. It can be seen therefore, as stated hereinbefore, that the complex, machine dependent wiring occurs only at the actuator 20 and in a modular fashion.

As stated hereinbefore, node 20 hardware is identical from node 20 to node 20, thereby implying that each machine product application control system 200 is identical, with the only differences being in the number of nodes 202 and the machine (not shown) dependent wiring.

Figure 3:
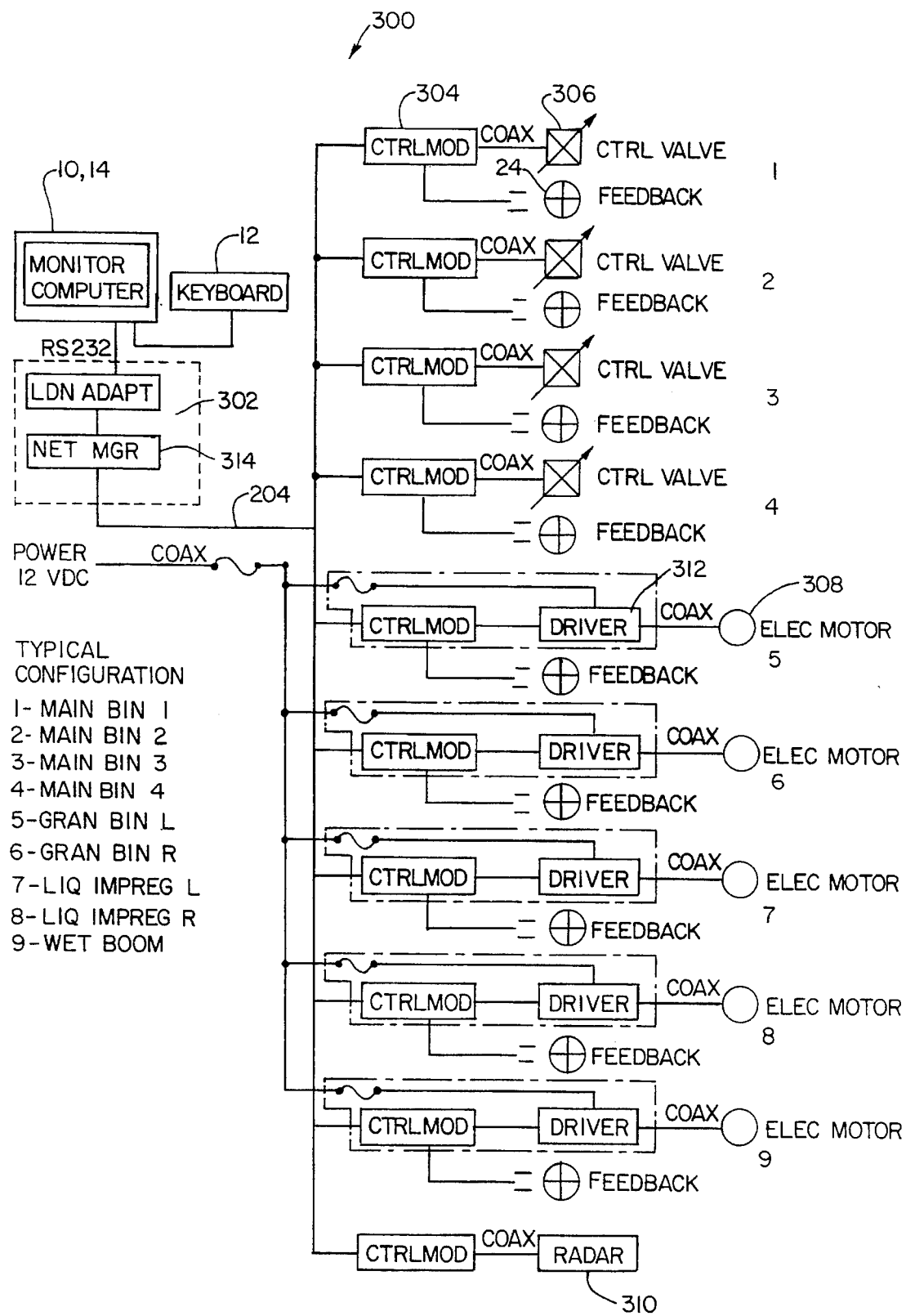
FIG. 3 is a more detailed block diagram of the present inventive product application control system depicting one embodiment for controlling the application of specific agricultural products.

The present inventive product application control system will now be further described in even more detail with the aid of FIG. 3 and the following definitions.

Object-oriented Software—Software development using the object-oriented methodology models the problem domain as a collection of real-world objects, and translates these objects into executable program code in a manner that promotes reusability, maintainability, and extensibility, among others.

Windows Interface—A Graphical User Interface extension of an operating system, built upon a message-based multi-tasking system, as opposed to a classical system built on a single thread of execution.

Distributed Network—A hardware design methodology that takes advantage of advances in network communications and applies them in the control domain.

Echelon LonWorks Technology—A hardware system that fully exploits the distributed network concept, and greatly eases the more complex communication requirements that are brought about by the use of distributed processors.

Referring now to FIG. 3, one preferred embodiment 300 for the present product application control system includes a computer 14 with associated input and output devices 12, 14 located within the cab of the vehicle. Embodiment 300 includes a nodal control module 304 located at each node 202. Placing the node control 304 at the location of the actuator 20 reduces attenuation of the signal, the incorporation of noise and the packaging of loop dependent controllers, as stated hereinbefore.

Embodiment 300 for the present inventive product application control system, shows numerous control valves 306, numerous electric motors 308 and a radar device 310 as a few of many alternatives for actuator 20. Thus, the intelligence of the controllers 304 are distributed throughout the vehicle (not shown), thereby allowing a great enhancement of the diagnostic system. As stated hereinbefore, with the control loops having control modules 304 separated, and with each node 202 capable of self-sustained control, each loop can be independently responsible for diagnostics, failure testing and minimal data-logging, thereby freeing the main processor 14 from such tasks as communication, and allowing the real generation of expert systems for multiple map input command processing.

Control modules 304 utilize Echelon LonWorks technology, a well established international standard, to support the aforementioned benefits, as Echelon LonWorks technology results in an intelligent distributed network, with many of the required features built in. Echelon LonWorks technology supports easy incorporation of nodal diagnostics, minimized communications; and as stated hereinbefore, the majority of calculation related to command costs are calculated at the node 202 level rather than at the host 14 level and communicated across the network 300.

Still referring to FIG. 3, the distributed network including multiple control modules 304 incorporating Echelon LonWorks technology effectively communicate with processor/computer 14 via twisted pair wire 204 and network adaptor 302. Network adaptor 302 includes network manager 314 which includes object-oriented software as stated above. It is to be noted that use of object-oriented software, although not necessary to practice the present invention, can be critical in an ever-changing system and is necessary to practice the best mode in the instant case. As stated above, the use of object-oriented software translates on top down system into a dynamic system that reacts to the world around it. Such a dynamic system is accomplished in the instant case with a message based system such as the Windows Interface, which increases userability and also allows a new approach to task completion as stated above.

Looking again at FIG. 3, the distributed network illustrated in embodiment 300 for the present inventive product application control system has been simplified by moving the wiring out to the nodes 202. This results in more complicated communication issues because a new requirement to the system requiring communication to all of the nodes 202 instead of just a single node as illustrated in FIG. 1, has been added. This increased complexity in communication is so substantial that the benefits of wiring simplification has not motivated others to use distributed networks as part of a product application control system. The present invention, however, overcomes the communication complexity issues by combining state-of-the-art technologies including Object-oriented Software, Windows Interfacing, Echelon LonWorks technology and Distributed Network controls.

It is to be particularly noted that each control module 304 is completely interchangeable with any other control module 304 on the distributed network 300 illustrated in FIG. 3. This is because each control module 304 is identical. Each control module 304 controls an actuator 20 which may be, for example, a control valve 306, an electric motor 308, a radar device 310 or any multitude of product application actuator devices. Each control module 304 has a functional requirement which is determined by the type of actuator 20 to which it is attached.

The function of each control module 304 is controlled via instructions from processor/computer 14. The use of the aforementioned Echelon LonWorks technology allows the hardware associated with each control module 304 to be reconfigured according to instructions from computer 14. Thus, it is unnecessary to mechanically reconfigure control modules 304 using dip switches, for example, to interface with an actuator 20 that can be hooked into the embodied distributed network 300.

The sophistication of the present inventive product application control system is further illustrated by looking at feedback 24. For example, feedback 24 may be any of a known multitude of signals including frequency, amplitude and voltage or current, etc. Therefore, any unique wiring occurs only at a specific device actuator site. Thus, it is only necessary to locate a node 202 and a device actuator 20 site and mechanically configure approximately one foot or so of unique wiring at each node 202. This results in wiring that is greatly simplified by locating each node 202 at the site of interest.

Furthermore, the independence of each control module 304 and use of the aforementioned combination of modern technologies allows each actuator 20 to apply product to an area in response to a product application map which is unique to only that particular nodal control module 304. In previous systems, all of the actuators 20 in the product application control system necessarily responded to a single application area map creating undesirable restrictions on product applications.

Figure 4:
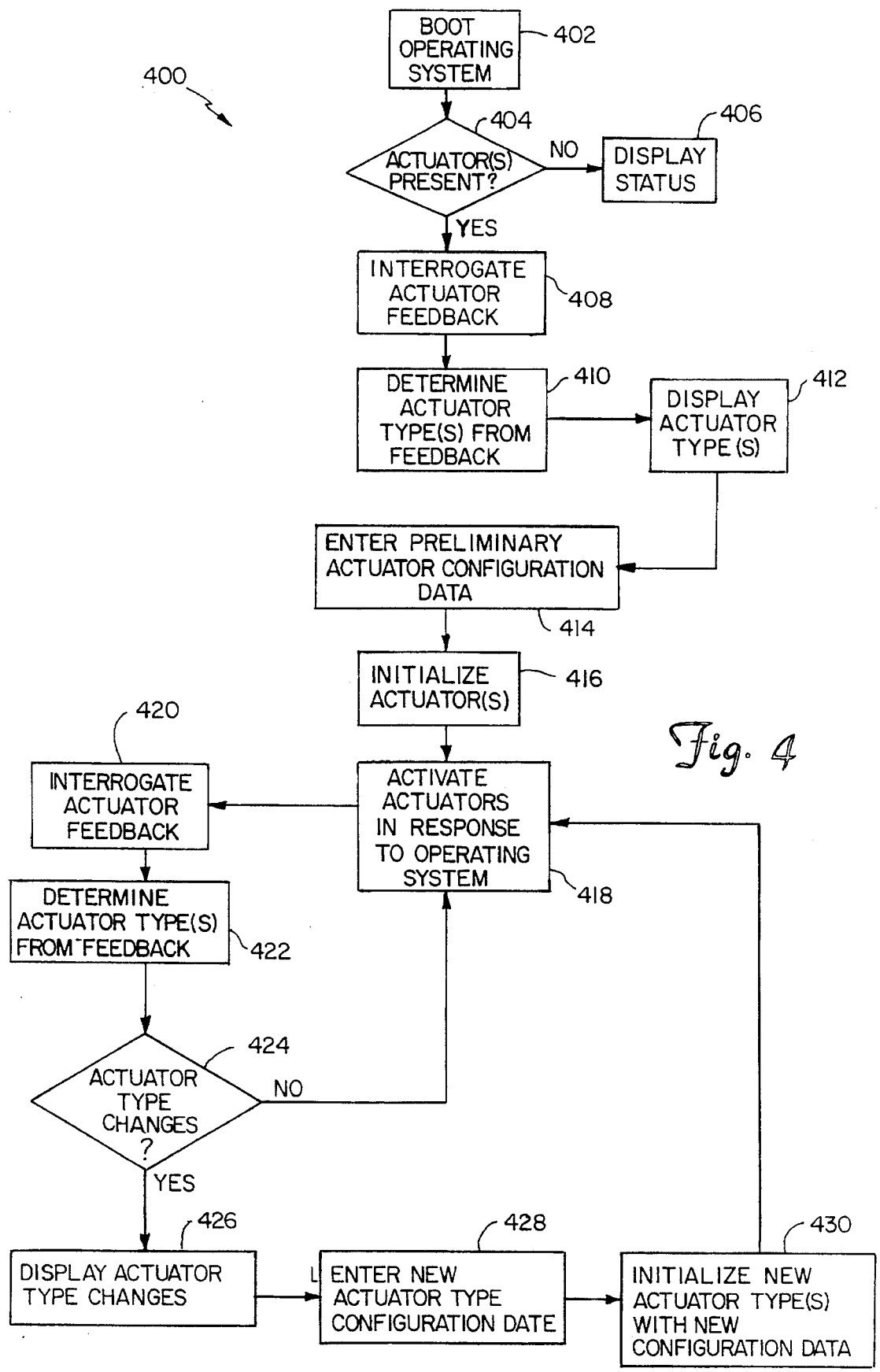
FIG. 4 illustrates a simplified flow diagram for one preferred embodiment for operating the present inventive product application control system shown in FIG. 3.

Moving on now to FIG. 4, there is illustrated a simplified flow diagram of one preferred embodiment 400 for operating the present inventive product application control system. Starting with block 402 the product application control system is first booted up thereby activating the operating system containing object-oriented software in conjunction with a Windows environment. This system operates initially by going out and examining the distributed network to determine if any actuators are present as indicated in decision block 404. If no actuators are present, display 10 will inform the operator of the system status as shown in block 406. If, as shown in block 408, actuators are present, computer 10 then interrogates the distributed network via the network adapter 302 by examining the feedback 24 for every actuator. The number and types of actuators contained within the distributed network are then determined as shown in block 410. Once the actuator types, quantity and locations have been determined, this information is displayed on monitor 10 as indicated in block 412. Based on the data displayed in block 412, an operator can then enter preliminary configuration data for each actuator type contained within the distributed network as shown in block 414. This data is subsequently used to initialize each actuator type with a preliminary function to establish a mode of operation as shown in block 416. It can be seen in block 418 that each activator within the distributed network is then activated in response to its initialized functional mode of operation as determined by the operating system.

As indicated herein before, actuators 20 within the distributed network 300 are continuously interchangeable within one anther without having to make any physical modifications to either the actuators 20 or the distributed network 300. Any changes to the distributed network 300 are handled in block 420 which shows that the operating system continuously interrogates actuator feedback 24 on the distributed network 300. This feedback 24 is used to determine the actuator types, 306, 308 and 310, as indicated in block 422. If actuator changes have occurred, and the type of actuator has changed as well, the operating system senses these changes as shown in block 424. If no changes have occurred, all existing actuators will continue to respond to the operating system in response to the preliminary configuration data. If any actuator types have changed, these changes are displayed to an operator on monitor 10 as illustrated in block 426. The displayed actuator type data then allows an operator to enter any new required actuator configuration data for the new actuator type as shown in block 428. Any new actuator types are then initialized with new configuration data as shown in block 430 in response to the new actuator type configuration data entered at block 428. Once all new actuator types have been initialized with new configuration data, the network 300 continues to operate in response to the operating system as shown in block 418.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful for the agronomic industry, those of skill in the art will readily understand and appreciate that the present invention has substantial use and provides many benefits in other industries as well. Some of these may include practicing the present invention to spread products such as sand, gravel or salt on roads or highways. In general, the agronomic community would find the present invention useful in applying products such as fertilizers including starter fertilizers, insecticides, herbicides, as well as seeds. It is to further be appreciated that the present invention may apply such products in either liquid or solid form.

I claim:

1. A mobile control system comprising:
   (a) a plurality of control modules for controlling at least one actuator device, wherein each control module within said plurality of control modules is responsive to at least one land area map for controlling at least one actuator device, and wherein said plurality of control modules are coupled to a self-propelled vehicle external to a vehicle operator cab;
   (b) networking means for distributing said plurality of control modules together on a distributed network;
   (c) computing means coupled to said distributed network for configuring a function for at least one control module within said plurality of control modules;
   (d) monitoring means coupled to said computing means for visually providing an operator status data for said distributed network;
   (e) data entering means coupled to said computing means for providing network configuration data for said computing means; and
   (f) network interfacing means coupled to said computing means for communicating said configuration data to said distributed network.

2. The control system as claimed in claim 1 wherein each said control module function is reconfigurable without requiring any physical modifications.

3. The control system as claimed in claim 1 wherein each control module within said plurality of control modules is interchangeable with one another without requiring any physical hardware modifications.

4. The control system as claimed in claim 1 wherein said data entering means comprises a keyboard.

5. The control system as claimed in claim 1 wherein said data entering means comprises a mouse.

6. The control system as claimed in claim 1 further comprising at least one device driver, such that at least one control module within said plurality of control modules is coupled to said at least one said device driver.

7. The control system as claimed in claim 6 further comprising at least one actuator, such that said at least one device driver is coupled to said at least one actuator.

8. The control system as claimed in claim 7 further comprising at least one feedback means for communicating operational characteristics of said at least one actuator to at least one control module within said plurality of control modules.

9. The control system of claim 1, wherein said at least one land area map is associated solely with a single predetermined control module within said plurality of control modules.

10. The control system of claim 1, wherein said at least one land area map is common to at least two control modules within said plurality of control modules.

11. The control system of claim 1, wherein said network interfacing means comprises a single twisted pair of wires.

12. A method of operating a distributed network mobile control system, said system of the type comprising a plurality of control modules for controlling at least one actuator device, each control module within said plurality of control modules being responsive to at least one land area map for controlling at least one actuator device, and wherein said plurality of control modules are coupled to a self-propelled vehicle external to an operator cab; networking means for distributing said modules together on a distributed network; computing means coupled to said distributed network for configuring a function for at least one control module within said plurality of control modules; monitoring means coupled to said computing means for visually providing an operator status data for said distributed network; data entering means coupled to said computing means for providing network configuration data for said computing means; and network interfacing means coupled to said computing means for communicating said configuration data to said distributed network, said method comprising the steps of:
   (a) entering preliminary operating mode and land area map configuration data into said computing means;
   (b) communicating said preliminary operating mode and land area map configuration data to said plurality of control modules such that said each control module within said plurality of control modules is initialized with a predetermined mode of operation, wherein said mode of operation is responsive to said land area map configuration data;
   (c) controlling said at least one actuator device with said plurality of initialized control modules over a first selected land area determined by said land area map configuration data;
   (d) entering new land area map configuration data into said computing means;
   (e) communicating said new land area map configuration data to a predetermined number of control modules within said plurality of initialized control modules such that said predetermined number of control modules within said plurality of initialized control modules are reinitialized to be responsive to said new land area map configuration data; and
   (f) controlling said at least one actuator device with said plurality of initialized control modules having said predetermined mode of operation responsive to said land area map configuration data, over said first selected land area determined by said land area map configuration data and said predetermined number of reinitialized control modules having said predetermined mode of operation responsive to said new land area map configuration data, over a second selected land area determined by said new land area map configuration data.

\* \* \* \* \*